350-441

SR

OR 4,012,126

X 4085 N

United States Patent [19]

[11] 4,012,126

[45] Mar. 15, 1977

Rosendahl et al.

[54] OPTICAL SYSTEM FOR 360° ANNULAR IMAGE TRANSFER

[75] Inventors: Gottfried R. Rosendahl; Wiley V. Dykes, both of Winter Park, Fla.

[73] Assignee: The United States of America as represented by the Secretary of the Navy, Washington, D.C.

[22] Filed: Apr. 8, 1974

[21] Appl. No.: 458,610

[52] U.S. Cl. ................................ 350/198; 350/200

[51] Int. Cl.[2] .................... G02B 13/06; G02B 17/08

[58] Field of Search .............. 350/198, 199, 21, 27, 350/200

[56] References Cited

UNITED STATES PATENTS

| | | | |
|---|---|---|---|
| 2,430,595 | 11/1947 | Young | 350/198 |
| 3,240,113 | 3/1966 | Stechemesser et al. | 350/198 X |
| 3,505,465 | 4/1970 | Rees | 350/198 UX |

*Primary Examiner*—John K. Corbin
*Attorney, Agent, or Firm*—Richard S. Sciascia; John W. Pease

[57] ABSTRACT

An optical system for 360° image transfer in which spaced primary and secondary hyperbolically surfaced mirrors are combined with a refractive lens system and are held in spaced relation by a transparent envelope having inner and outer surfaces generated from the near focal point of the primary mirror to avoid ray pass through distortion, and in which the mirrors are so spaced and concentrically arranged that the entrance pupil of the lens system coincides with the near focal point of the primary mirror, which is centrally apertured to form an aperture stop (diaphragm), and the near focal point of the secondary mirror approximates the apex of the primary mirror, the far focal points of the mirrors coinciding to form a confocal set of mirrors.

3 Claims, 2 Drawing Figures

OPTICAL SYSTEM FOR 360° ANNULAR IMAGE TRANSFER

CROSS-REFERENCE TO RELATED APPLICATION

This application is related to U.S. application presently identified by Ser. No. 459,143, filed Apr. 8, 1974.

BACKGROUND OF THE INVENTION

The invention relates to the field of optics and more particularly to a wide angle image transfer system capable of transforming images up to 360° wide in conjunction with the taking and projection of pictures.

In many training situations the presentation of external environment is a necessity in order for the trainee to perceive visual cues and thereby learn to take actions or manipulate equipment to maximum advantage for a given situation. A particularly useful approach to reality in display is to produce an extremely wide-angle presentation to produce the effect of the observer being in the center of the scene activity. One prior attempt at 360° image transfer in the taking and projecting of an image has been to use a convex mirror to gather and project the 360° scene in association with a viewing piece on film. A difficulty with this approach is the unavoidable distortions of image which occur in the taking of a picture with a convex mirror as indicated above. The distortions resulting from an attempt to image on a plane a hyper-hemispherical space can be eliminated by projecting the distorted picture back through the same optical system and onto a spherical screen, provided the camera and the projector optics have the same distortion features and the viewer's eyes coincide with the exit pupil of the projection lens, or nearly so. In this respect, applicants' copending application teaches an arrangement of elements which substantially provides the coincidence feature mentioned above. This present application takes the problem a step further and teaches a selection and arrangement of lens mirrors, lens supporting transparent means and a refractive lens system which provides an optical system for up to 360° image transfer, with elevation of 90° which may be distributed 30° up and 60° below horizon and vice versa while providing minimum image aberrations in image taking as well as projection and provides correction for axial color and color magnification, to thereby provide a useful tool for any application involving the taking and/or projection of an image.

Summary of the Invention

In accordance with the invention, an image transfer means for up to 360° application with improved minimum image quality characteristics is provided in the form of primary and secondary hyperbolic surfaced mirrors held in confocal spaced relation by a rigid transparent envelope having inner and outer surfaces developed in symmetry from the near focal point of the primary mirror, the entrance pupil of the lens system coinciding with the near focal point of the primary mirror, the near focal point of the secondary mirror approximating the apex of the primary mirror, and a central aperture in the primary mirror forming a stop (diaphragm) for rays entering a refraction lens system of positive and negative lens components and including a lens component of negative power between 0.75 and 1.25 of the overall power of the refractive system in the area of said aperture stop to provide a strong positive contribution to Petzval curvature of the system.

DESCRIPTION OF THE PREFERRED EMBODIMENT

Figure 1:
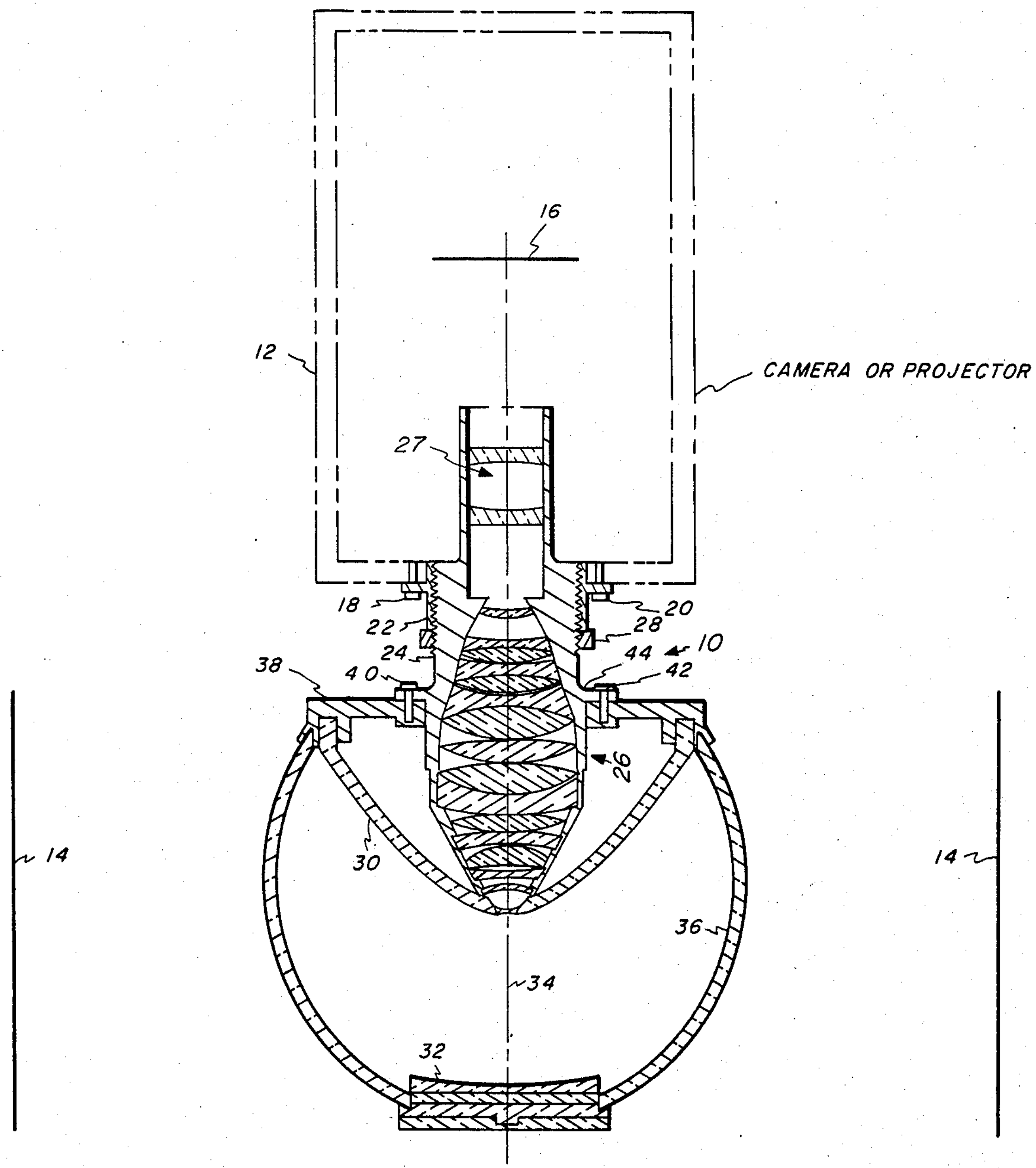
FIG. 1 is a cross sectional view of an image transfer apparatus incorporating the invention and shown in relation to projector or camera equipment with which it would be used.

Referring to FIG. 1, there is shown apparatus, indicated generally at 10, for 360° annular image transfer and attached thereto alternately a camera or projector, indicated at 12, and associated with a 360° scene or screen, indicated at 14. In taking pictures of a scene the apparatus 10 is attached to a camera 12 to bring in a 360° image for application to its film, indicated at 16. In projecting a picture the apparatus 10 is connected to a projector 12 for displaying the image of the film 16 on a screen 14. The use of the dotted line 12 for camera or projector and the lines 14 for scene or screen are employed to avoid unnecessary duplication of drawing figures, the same apparatus 10 (or identical apparatus) which incorporates the invention is used both in the taking or projection of image. It is to be understood that while the capability of the image transfer apparatus is 360° of view, it may be used for any width of picture up to and including 360°.

As shown in FIG. 1, the apparatus 10 is attached to the element 12 (camera or projector) by suitable means such as bolts 18, 20 which hold an internally threaded connector means 22 into which is threaded an externally threaded housing 24 which accommodates groups of lenses constituting a refractory lens system, generally indicated at 26. The housing 24 is adjustably threaded into the connector 22 to adjust focus of the apparatus and is locked in adjusted position by a lock nut 28.

Primary and secondary hyperbolically surfaced mirrors, 30 and 32 respectively, are held in aligned spaced symmetrical position about the optical axis 34 of the apparatus by a transparent envelope 36 (also referred to as a dome). The envelope and mirrors are attached to the lens housing 24 by suitable means, which in the preferred embodiment is shown as an annulus 38, and attaching bolts 40 and 42 passing through a flange 44 of the lens housing 24.

In this arrangement an image taken from scene 14 is passed through envelope 36 to primary mirror 30, thence to secondary mirror 32 where it is redirected through the refractory lens system 26 to the film 16. In projection, the image from film 16 is projected through refractory lens system 26 to secondary mirror 32 and thence via primary mirror 30 and envelope 26 to a screen 14. Details of a suitable projector are set forth in my copending U.S. patent application identified as Ser. No. 459,143, filed Apr. 8, 1974.

Figure 2:
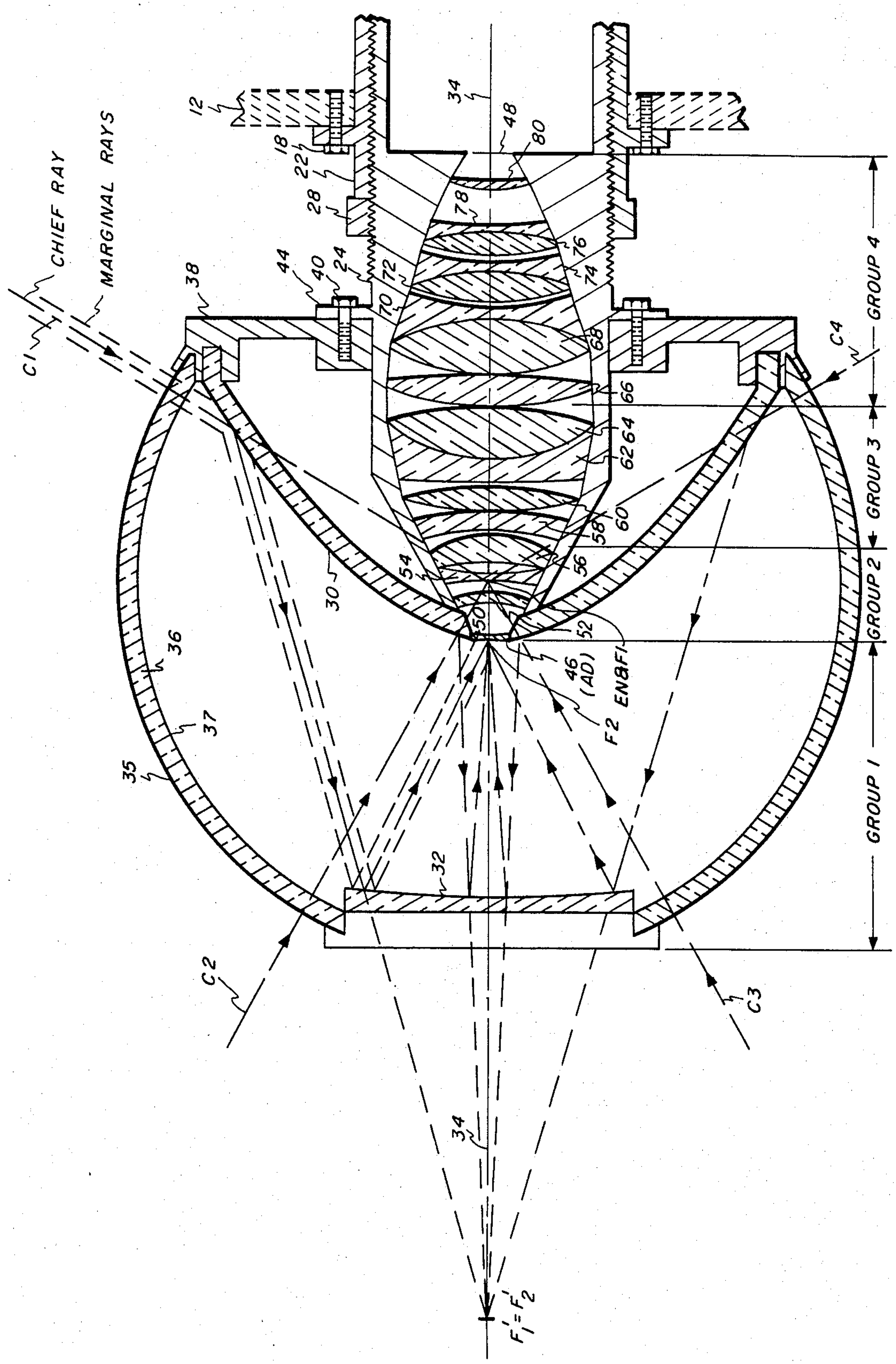
FIG. 2 is a diagrammatic illustration of the arrangement and association of elements of the apparatus of FIG. 1 in relation to the optics functions thereof.

For an understanding of the various parameters, spaced arrangements of elements and contour generation which incorporate applicants' invention, attention is now directed to FIG. 2. The several elements, primary mirror 30, secondary mirror 32, envelope 36 and the refractory lens system 26 (set forth in groups) are shown in FIG. 2 arranged in symmetrical position about the optical axis 34. A portion of the annulus 38 holding the envelope 36 and mirrors 30, 32 and portions of the threaded attachment and lens housing 24 are also shown for orientation.

The refractory lens system 26, as shown in FIG. 2, is positioned between a stop 46 and an image plane 48 coaxially along the optic axis 34. Components of the lens system as viewed from left to right in FIG. 2 include lenses 50, 52, 54, 56, 58, 60, 62, 64, 66, 68, 70, 72, 74, 76, 78 and 80. The stop 46 is an aperture centered in the primary mirror 30 and is also commonly referred to as an aperture diaphragm. The image plane 48 is a plane, shown vertically in FIG. 2, and denotes an intermediate image plane should a relay lens set be contemplated to increase the image from say 25 to 50mm. In the overall system each element has one or more surfaces which direct rays. Envelope 36, for example, has surfaces 35 and 37.

The various elements of the optic system as shown in FIG. 2 have been divided into four groups for detailed description of function, arrangement and specifics of generated surfaces. The near and far focal points of primary mirror 30 are indicated at $F_1$ and $F_1'$ on axis 34. The near and far focal points of secondary mirror 32 are indicated at points $F_2$ and $F_2'$ on axis 34. Since, according to the invention, the mirrors 30 and 32 have been generated as confocal hyperbolic, the confocal points $F_1'$ and $F_2'$ coincide as indicated in FIG. 2. The entrance pupil (EN) of the lens system coincides with the focal point $F_1$ on axis 34. The image plane 48, in optics also referred to as a dummy surface, is the first (intermediate) image plane of, for example, 25mm (millimeters) diameter. The plane 48 may be relayed and enlarged to a second or final image plane of say 50mm diameter. Since a relay system is not part of the invention or required for operation, it is not detailed. A relay lens system is indicated generally at 27 in FIG. 1. Aperture 46, also referred to in optics as a dummy surface, coincides with focus point $F_2$ and is referred to hereinfter as the aperture diaphragm (AD) of the overall lens system.

Referring now to the four groups of elements as set forth in FIG. 2, Group 1 includes the transparent envelope 36 having surfaces 35 and 37 generated from $F_1$ as a center of radius, the entrance pupil (EN) location at $F_1$, and the mirrors 30 and 32. Group 1 may be considered as an inverse telescope. Its purpose is to reduce the large vertical field angles to amenable magnitudes for a refractive system, without introducing large amounts of spherical aberrations, coma and astigmatism. In addition, the surface development and arrangement of Group 1 takes into consideration the system requirement of providing a flat image plane.

Surfaces of mirrors 30 and 32 being confocal and near focus point $F_1$ being the center of the entrance pupil (EN) of the system, therefore all incident chief rays, examples $C_1$, $C_2$, $C_3$ and $C_4$, are pointing at $F_1$ and reflected toward $F_2$ as indicated in FIG. 2. $F_2$ coincides with AD, the aperture diaphragm 46. Since $F_1'$ coincides with $F_2'$, then $F_2$ is an image of $F_1$ and thus of EN, which is the entrance pupil of the system. In accordance with the invention it was found practical to make $F_2$ and AD coincide with the apex of the hyperboloidal mirror 30. The hole to be cut through the mirror is then minimum.

Since one focal point of a conic surface is imaged without astigmatic error, i.e., anastigmatically into the other focal point, $F_1$ then is imaged anastigmatically into $F_2$. Astigmatism on mirrors is determined only by the meridional and sagittal curvatures at the point of incidence. These curvatures must be thus so that no astigmatic error occurs for any ray between $F_1$ and $F_2$, independent of the object position along these rays. The foregoing follows the fact that the relationship between meridional and sagittal curvatures for anastigmatic imagery does not contain the object or image distance. Thus, according to the arrangement of elements in Group 1, it can be concluded that all differential rays (rays infinitesimally close to the chief ray) accompanying a chief ray through AD, the aperture diaphragm located at aperture 46, provide anastigmatic imagery.

Considering further the elements of Group 1, in the optimum combination of hyperbolic mirrors 30, 32 with respect to optical performance, primary mirror 30 is formed with a relatively small radius and small eccentricity in relation to secondary mirror 32 which is formed with a relatively large radius and large eccentricity, whereby the angle difference between differential rays accompanying and parallel to the chief ray in object space and in meridional plane becomes negligibly small. This results in coma becoming negligibly small for all practical purposes. At the same time, the difference between image distances for the maximum and minimum ray, 120° and 30° toward optic axis 34, becomes reasonably small which in turn facilitates field curvature correction with the refractive lens system 26, which follows the mirrors, even though the field curvature produced by the mirrors is negative.

The selection, arrangement and association of elements as described above for Group 1 not only provides a vertical angle of 90° without vignetting, but also permits the use of a transparent envelope (dome) 36 to enclose and suport the mirrors 30 and 32. Since, according to the invention, the envelope is centered at $F_1$, all chief rays will pass normal to the surfaces 35, 37 of envelope 36 and thereby introduce neither coma nor astigmatism.

In accordance with an aspect of the invention, the remaining groups of lenses, i.e., Groups 2, 3 and 4, are provided; Group 2 to contribute positive coefficients to Petzval curvature and to bend the chief rays toward the optical axis 34 and into approximately parallel position thereto; Group 3 to provide correction for color magnification; and Group 4 to finally bring the light rays back to the image plane 48. Groups 2, 3 and 4 combined also provide axial color correction. In Group 2, the four lens elements 50, 52, 54 and 56 are uncemented and spaced for air cooling because of the lens proximity to the aperture diaphragm, AD, identified as a stop 46, and the heat developed when the arc image is formed at AD during projection. The first lens 50 is made of quartz glass to withstand the heat. Further, the lens 50 is formed to provide a strong negative power between 0.75 and 1.25 of the overall power of the refractive system to provide the desired positive contribution to Petzval curvature of the system. The remaining lenses in the Group 1 are spaced as indicated, lens 52 being slightly positive and usable for fine correction, lens 54 being negative and lens 56 being a comparatively strong positive component, making the axial paraxial ray almost parallel to the axis 34. The glasses for the components 52, 54 and 56 have been selected so that they will support color correction in conjunction with the task of obtaining positive Petzval curvature.

The Group 3 lenses include the lens elements 58, 60, 62 and 64. The main purpose of Group 3 is to correct for axial color and color magnification. This is achieved by using crown and flint glasses of almost equal refractory index but different dispersion and making the combined power of Group 3 negligibly small as compared to Groups 2 and 4.

The Group 4 lenses includes thelenses 66, 68, 70, 72, 74, 76, 78 and 80 which are provided to form the final image of about 25mm diameter at the image plane 48. Such plane may be considered as an intermediate image plane if a different final format, such as a 50mm diameter image, is to be obtained by relay lenses. Further processing of an intermediate image of 25mm diameter by a relay lens system as indicated at 27, FIG. 1, is desirable to avoid increasing the size of input mirrors and the other parts of the optical system to an unwieldy size. The 50mm diameter is useful in anticipation that the optical system described hereinbefore may be used with a camera and movie projector for 70mm film with 50mm usable width.

In summary, the invention as described hereinbefore provides an optical system for up to 360° annular image transfer, with elevation angle of 90° which may be distributed 30° up and 60° down from the horizon, or vice versa, and an F/2.5 for an image of 25mm, and the concurrent advantages of avoidance of excessive amounts of aberrations, such as field curvature and astigmatism, the passage of the extreme trigonometrically-traced rays in the meridional plane, and color errors.

It is understood that various changes and modifications can be made in the arrangement of parts and choice of elements without departing from the true spirit and scope of the invention, and it is intended that the appended claims be accorded an interpretation sufficiently broad as to cover such changes and modifications.

What is claimed is:

1. An opticl system of 360° annular image transfer comprising:

spaced primary and secondary hyperbolically surfaced mirrors each having near and far focal points, said primary mirror having an apex;

said primary mirror being formed with a relatively small radius of curvature and small eccentricity in relation to said secondary mirror such that the angle difference between different rays accompanying and parallel to a chief ray in object space and in meridional plane becomes negligible;

an envelope of optically suitable transparent material having an outer and inner surface generated in symmetry from said near focal point of said primary mirror and attached to said mirrors to hold the same in spaced axial symmetry;

a refraction lens system of positive and negative lens components;

said primary and secondary mirrors and said lens system constituting a total optical system having an entrance pupil;

said mirrors being faced with the mirrored surfaces toward each other and held in a spaced relationship by said envelope such that said entrance pupil of said total optical system coincides with the near focal point of said primary mirror, the near focal point of said secondary mirror approximates the apex of said primary mirror, and the far focal points of said mirrors coincide to form a confocal set of mirrors;

said primary mirror being centrally apertured to form an aperture stop to pass reflected light rays to said refraction lens system;

said refracrtive lens system including a heat resistant lens component of negative power between 0.75 and 1.25 of the overall power of the refractive system positioned in the immediate area of said aperture stop to provide a strong positive contribution to Petzval curvature of the system; and three successive groups of lenses to respectively bend the chief rays toward the opticl axis of the lens system into approximately parallel position thereto, to provide correction for axial color and color magnification and finally to bring the light rays back to the image plane.

2. Apparatus according to claim 1, including housing means having an annulus support connected to said envelope, to said primary mirror, and to said refraction lens system to support the same in symmetry about an axis passing through the image plane of said lens system.

3. Apparatus according to claim 2, said housing means having an externally threaded portion to act as a male component in the connection of said apparatus selectively to a camera or projector means and provide in such connection, means for adjusting the focus of said lens system.

* * * * *